R. S. JENNINGS.
Reversible Filter.
No. 234,408.                    Patented Nov. 16, 1880.
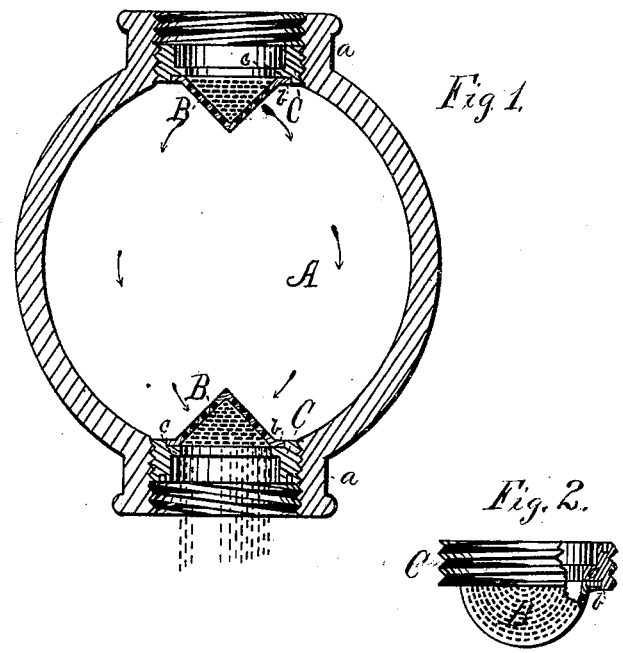
WITNESSES
A. G. Huylman.
S. S. Kane
INVENTOR
Ralph S. Jennings.
E. W. Johnson & Co.,
ATTORNEYS.

UNITED STATES PATENT OFFICE.

RALPH S. JENNINGS, OF BALTIMORE, MARYLAND.

REVERSIBLE FILTER.

SPECIFICATION forming part of Letters Patent No. 234,408, dated November 16, 1880.

Application filed February 18, 1880.

*To all whom it may concern:*

Be it known that I, RALPH S. JENNINGS, a citizen of the United States, residing at Baltimore, in the county of Baltimore and State of Maryland, have invented certain new and useful Improvements in Reversible Filters, of which the following is a specification.

This invention relates to that class of globe water-filters used on faucets or hydrants.

Heretofore a hollow sphere composed of two parts, having a fixed strainer at one end and a removable strainer and bushing at the other end, as shown in Letters Patent No. 197,627, dated November 27, 1877, has been used as a filter. A filter of this construction is objectionable for the reason that it requires the globe to be made in two parts for the introduction and attachment of the fixed strainer; also necessitates the employment of a bushing having internal and external screw-threads, and the use of suitable washers interposed between the bushing, the socket of the globe, and the detachable strainer.

The main objects of my improvement are to remove these objections, dispense with the unnecessary elements, and to cheapen the manufacture of this class of filters; therefore the improvement consists in the combination of the globe made in one piece, having screw-threads at each end, the detachable thimbles formed with inwardly-projecting flanges and grooves, with the strainers permanently located within the grooves of the thimbles, as will be hereinafter more fully set forth, and pointed out in the claim.

In the annexed drawings, Figure 1 is a vertical section of a device embodying my invention. Fig. 2 is a modification of the concave strainer.

A represents a cast-metal globe, which is provided with openings $a\ a$, with female screw-threads. The openings $a\ a$ are adapted to receive the thimbles C C, in which are secured concave strainers B B. The thimbles C C are provided with inwardly-projecting flanges $c\ c$, the lower part of which is grooved, in which grooves $b\ b$ the bases of the strainers B B are secured.

I may make the strainers convex, conical, or other analogous shape without departing from the spirit of my invention.

It will be observed by reference to Fig. 1 of the drawings that the diameters of the thimbles are such that they will fit within the screw-threaded portions of the globe, and are of such a thickness when set home that sufficient space will be left for the attachment of the globe to the supply-pipe or faucet.

The operation of my invention is as follows: The filter is attached to a faucet by means of the screw-threads on the neck of the globe or thimble, and the liquid admitted therefrom comes in contact with the concave strainer and is separated and passes through all parts of the filter instead of directly downward, as would be the case if it were not provided with such an inlet. The liquid after passing through the filtering medium contained in the globe passes out through the convex strainer, which causes the fluid to collect and be discharged in a compact body.

When the filter becomes foul it can be cleansed by simply reversing the globe and allowing the liquid to flow for a few minutes, when the impurities will be removed.

What I claim as new, and desire to secure by Letters Patent, is—

The combination, with the globe A, having screw-threads at each end, of the detachable thimbles C C, formed with the inwardly-projecting flanges $c\ c$ and grooves $b\ b$, and the strainers B B, located within the grooves $b\ b$ of the thimbles, substantially as described, and for the purpose set forth.

In testimony that I claim the above I have hereunto subscribed my name in the presence of three witnesses.

RALPH S. JENNINGS.

Witnesses:
 JNO. T. MADDOX,
 EUGENE W. JOHNSON,
 H. W. MCNEAL.